United States Patent
Asemann

(10) Patent No.: US 12,393,742 B2
(45) Date of Patent: Aug. 19, 2025

(54) CUSTOMIZATION OF A PROCESSING UNIT TO PROTECT AGAINST UNAUTHORIZED REMOTE-CODE EXECUTION

(71) Applicant: Elektrobit Automotive GmbH, Erlangen (DE)

(72) Inventor: Peter Asemann, Sindelfingen (DE)

(73) Assignee: Elektrobit Automotive GmbH, Erlangen (DE)

( * ) Notice: Subject to any disclaimer, the term of this patent is extended or adjusted under 35 U.S.C. 154(b) by 140 days.

(21) Appl. No.: 17/959,450

(22) Filed: Oct. 4, 2022

(65) Prior Publication Data

US 2023/0103582 A1   Apr. 6, 2023

(30) Foreign Application Priority Data

Oct. 5, 2021   (EP) .................................... 21201056

(51) Int. Cl.
*G06F 21/85* (2013.01)

(52) U.S. Cl.
CPC .................................. *G06F 21/85* (2013.01)

(58) Field of Classification Search
CPC ....................................................... G06F 21/85
See application file for complete search history.

(56) References Cited

U.S. PATENT DOCUMENTS

| | | | |
|---|---|---|---|
| 6,609,201 B1 * | 8/2003 | Folmsbee | G06F 9/30196 712/E9.035 |
| 8,250,656 B2 * | 8/2012 | Vlasov | G06F 21/566 712/226 |
| 2015/0039864 A1 | 2/2015 | Tobin | |
| 2019/0243952 A1 * | 8/2019 | Dekker | H01L 27/0203 |

FOREIGN PATENT DOCUMENTS

WO   WO-2006084375 A1 *   8/2006   ......... G06F 12/1408

OTHER PUBLICATIONS

"Secure Hardware-Software Architectures for Robust Computing Systems; Deliverable D4.2:", Horizon 2020 Program (2014-2020); Ref. Ares(2016)7200412—Dec. 30, 2016 Cybersecurity, Trustworthy ICT Research & Innovation Actions Security-by-design for end-to-end security Horizon 2020 Program (2014-2020) under grant agreement nº 644571. ICT 32-2014, 2016.

Gaurav S. Kc et al. "Countering Code-Injection Attacks With Instruction-Set Randomization", Proceedings of the 10th ACM Conference on Computer and Communications Security, ACM, Washington, DC, vol. Conf. 10, Jan. 1, 2003, pp. 272-280, XP002333430, DOI: 10.1145/948109.948146, ISBN: 978-1-58113-738-5.

"Secure Hardware-Software Architectures for Robust Computing Systems; Deliverable D3.3", Deliverable D3.3: Final Implementation of the SHARCS hardware techniques Ref. Ares(2017)5280846—Oct. 29, 2017, 2017.

Search Report dated Mar. 28, 2022 from corresponding European patent application No. 21201056.5.

* cited by examiner

*Primary Examiner* — Hee Soo Kim

(57) ABSTRACT

A processing unit is customized to prevent remote code execution of the processing unit. In a first step, a permutation of an instruction set of the processing unit is determined. Adaptations of the processing unit for implementing the permutation of the instruction set are then determined. Finally, the processing unit is customized in accordance with the determined adaptations.

12 Claims, 2 Drawing Sheets

CUSTOMIZATION OF A PROCESSING UNIT TO PROTECT AGAINST UNAUTHORIZED REMOTE-CODE EXECUTION

BACKGROUND

The present invention is related to a method, a computer program code, and an apparatus for customizing a processing unit, in particular to prevent remote code execution of the processing unit. The invention is further directed towards a processing unit that has been customized with such a method or apparatus.

In the field of information technology (IT), a tremendous amount of research aims at increasing the security of IT system. As IT systems are becoming increasingly complex, there is a constant threat that vulnerabilities might be found and exploited.

One known potential vulnerability is related to remote code execution. If attackers know the processor of the target and its instruction set, they can construct code for remote code execution. Remote code execution vulnerabilities thus allow an attacker to infiltrate a remote machine and to execute any code of their choice instead of the machine's legitimate code. Once inside, the attackers can open backdoors, trigger code remotely, steal data, or disrupt services.

A known approach to prevent or at least hamper remote code execution is instruction set randomization. This approach makes it practically impossible for attackers to know which bit representation the instruction set has on the specific target of the attack.

For example, the article by G. S. Kc et al.: "Countering Code-Injection Attacks With Instruction-Set Randomization", Proceedings of the 10th ACM conference on Computer and communications security (2003), pp. 272-280, discloses an approach for safeguarding systems against code-injection attacks. Process-specific randomized instruction sets are created of the system executing potentially vulnerable software. An attacker who does not know the key to the randomization algorithm will inject code that is invalid for that randomized processor, causing a runtime exception.

In the frame of the SHARCS (Secure Hardware-Software Architectures for Robust Computing Systems) project (https://cordis.europa.eu/project/id/644571/de), a framework for designing, building and demonstrating secure-by-design applications and services, that achieve end-to-end security for their users, is proposed. As part of the framework, an instruction-set randomization with XOR encryption using a 32-bit key has been implemented.

The configurable encryption implemented in the SHARCS framework requires additional logic, which makes this approach rather complex and expensive for a practical application.

It is an object of the present invention to provide a simplified solution for customizing a processing unit in order to prevent or hamper remote code execution of the processing unit.

BRIEF SUMMARY

This object is achieved by a method according to claim 1, by a computer program code according to claim 9, which implements this method, and by an apparatus according to claim 10. This object is further achieved by a processing unit according to claim 11. The dependent claims include advantageous further developments and improvements of the present principles as described below.

According to a first aspect, a method for customizing a processing unit comprises the steps of:
    determining a permutation of an instruction set of the processing unit;
    determining adaptations of the processing unit for implementing the permutation of the instruction set; and
    customizing the processing unit in accordance with the determined adaptations.

Accordingly, a computer program code comprises instructions, which, when executed by at least one processor, cause the at least one processor to perform the following steps for customizing a processing unit:
    determining a permutation of an instruction set of the processing unit;
    determining adaptations of the processing unit for implementing the permutation of the instruction set; and
    customizing the processing unit in accordance with the determined adaptations.

The term computer has to be understood broadly. In particular, it also includes workstations, electronic control units, embedded devices and other processor-based data processing devices. The computer may provide instruction to external hardware, such as a fabrication tool, for customizing the processing unit in accordance with the determined adaptations.

The computer program code can, for example, be made available for electronic retrieval or stored on a computer-readable storage medium.

According to another aspect, an apparatus for customizing a processing unit comprises:
    a permutation unit configured to determine a permutation of an instruction set of the processing unit;
    an adaptation unit configured to determine adaptations of the processing unit for implementing the permutation of the instruction set; and
    a customizing unit configured to customize the processing unit in accordance with the determined adaptations.

According to the invention, a permutation of the meaning of the bits of the instruction words for the instruction set of the processing unit is introduced. This permutation is specific to each processing unit so that adaptations of the processing unit are needed. The goal of this is to make remote code execution difficult or impossible. Assuming that a processor has an instruction set with a width of N bits, and the standard instruction set with a standard bit order is $P_o$, a number of N! (faculty of N) permutations is possible, which change the order of the bits. If a processor does not have the standard instruction set $P_o$, but a permutation $P_x$ of the standard instruction set with a different bit order, an exploit code of a remote attacker, e.g. aiming to execute shell code on the target, would likely produce an "illegal instruction" exception, if these are supported by the processor and not all possible instruction words are used, meaningful, or legal, or another, possibly arbitrary, fault in the target processor. The attacker would thus not succeed in taking over control of the target system. The solution has the advantage that additional effort is required to successfully produce remote execution exploit code for a given processor. This additional effort will generally be larger than the effort that may be invested by an attacker.

As the permutation $P_x$ of the instruction set used by a given processor is known to the manufacturer, it is still easy to produce executable code for that processor by simply permutating code compiled for the standard instruction set $P_o$ in such way that the resulting bit order corresponds to $P_x$. Software development can hence be made on processing units without permutation or with an identical permutation.

This has the advantage that normal debuggers can be used. This is not possible for a SHARCS processor, where activation of the encryption would need to be tested as well. Therefore, an adapted debugger would be required, which has knowledge about the keys for each memory range.

In an advantageous embodiment, the processing unit is customized by adapting hardware of the processing unit. Implementing the specific permutation for the processing unit unalterable in hardware has a number of advantages. A main advantage is that permutation cannot be turned off. As such, it cannot be circumvented. In addition, in contrast to the above-mentioned approach of the SHARCS project using encryption, no modification of the operating system, the bootloader or the software is necessary for activating the permutation. The changes are completely transparent for the software. Permuting the code after compilation or before flashing it to the processing unit requires only minimal effort. As no encryption-based approach is used, there is no security risk or risk of failure due to possible systemic errors during key loading or key changing. If the key is broken or not loaded correctly, the processing unit might not even be able to execute an exception handler correctly.

In an advantageous embodiment, the permutation of the instruction set is hard-wired in a data path from a memory of the processing unit to an instruction decoder of the processing unit. This approach has the advantage that it can be easily realized. No changes need to be made to the memory or the instruction decoder.

In an advantageous embodiment, hard-wiring of the permutation of the instruction set is realized with micro-fuses. The use of micro-fuses has the advantage that hard-wiring of the permutation can be realized using a single additional production step.

In an advantageous embodiment, hard-wiring of the permutation of the instruction set is realized with a multi-layer printed circuit board. The use of a multi-layer printed wire circuit board has the advantage that such boards can be produced in advance for the permutations that shall be used. During manufacturing of the processing unit, the appropriate board is selected and integrated into the data path.

In an advantageous embodiment, bit shifts in a first direction are realized in a first layer of the printed circuit board and bit shifts in a second direction are realized in a second layer of the printed circuit board. For example, a top layer of the printed circuit board may be used for all bit shifts to the left, whereas bit shifts to the right are realized on a bottom layer of the printed circuit board. This approach has the advantage that intersections of conductor paths can be avoided in a simple way.

In an advantageous embodiment, the multi-layer printed circuit board provides a signal run time adaption by a meandering signal routing. In this way, signal run time variations caused by different sizes of the bit shifts are compensated. This leads to a more reliable signal processing.

In an advantageous embodiment, the processing unit is customized by providing the processing unit with microcode that is specific to the permutation of the instruction set. For processing units using microcode, the permutation of the instruction word bits can be implemented by microcode that is specific to the given processing unit. In this way, no adaptation of the hardware is needed.

Advantageously, a processing unit is customized by a method according to the invention or by an apparatus according to the invention for implementing a permutation of an instruction set. Such a processing unit has the advantage that it is robust against remote code execution attacks.

Further features of the present invention will become apparent from the following description and the appended claims in conjunction with the figures.

DETAILED DESCRIPTION

Figure 1:
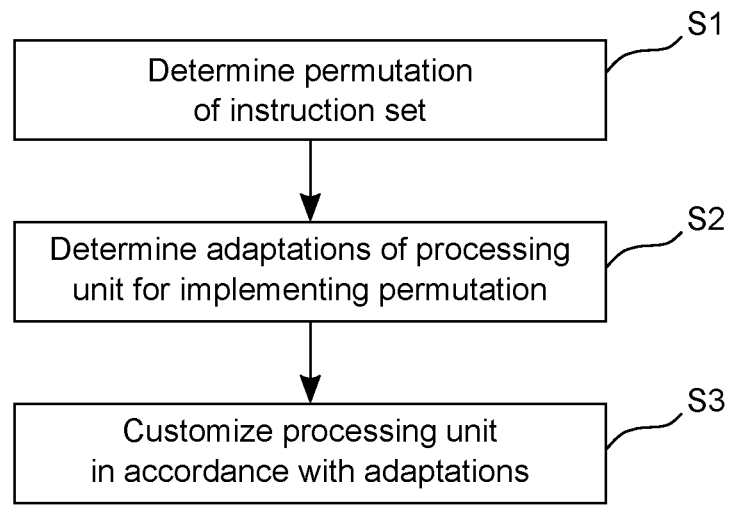
FIG. 1 schematically illustrates a method for customizing a processing unit.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method according to the invention for customizing a processing unit. In a first step, a permutation of an instruction set of the processing unit is determined S1. Adaptations of the processing unit for implementing the permutation of the instruction set are then determined S2. Finally, the processing unit is customized S3 in accordance with the determined adaptations. For example, the processing unit may be customized S3 by adapting hardware of the processing unit. For this purpose, the permutation of the instruction set may be hard-wired in a data path from a memory of the processing unit to an instruction decoder of the processing unit, e.g. with micro-fuses or with a multi-layer printed circuit board. In the latter case, bit shifts in a first direction may be realized in a first layer of the printed circuit board, whereas bit shifts in a second direction may be realized in a second layer of the printed circuit board. Advantageously, the multi-layer printed circuit board further provides a signal run time adaption by a meandering signal routing. According to an alternative solution, the processing unit may be customized S3 by providing the processing unit with microcode that is specific to the permutation of the instruction set.

Figure 2:
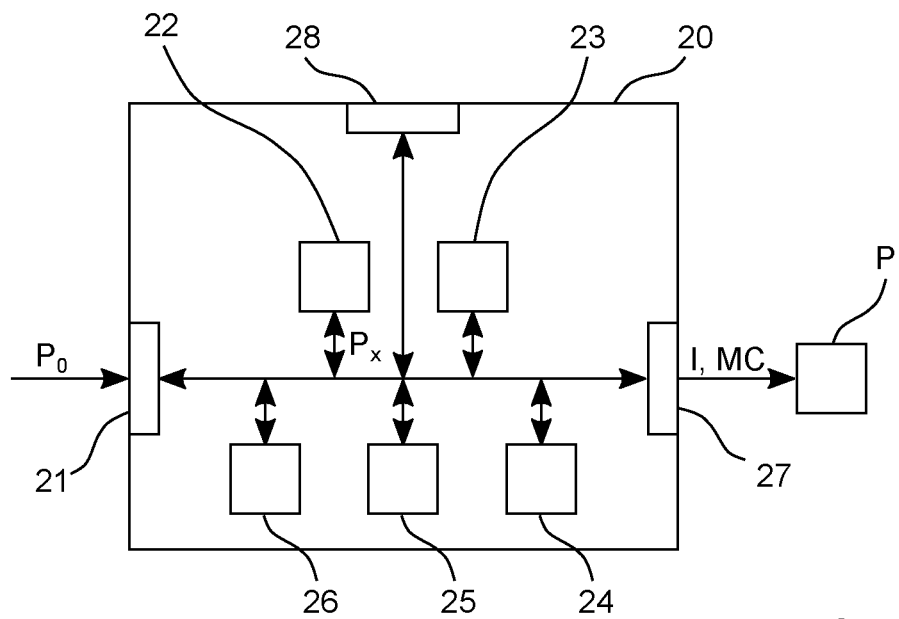
FIG. 2 schematically illustrates a first embodiment of an apparatus for customizing a processing unit.

FIG. 2 schematically illustrates a block diagram of a first embodiment of an apparatus 20 according to the invention for customizing a processing unit P. The apparatus 20 has an input 21, e.g. for receiving an instruction set $P_0$ of the processing unit P. A permutation unit 22 is configured to determine a permutation $P_x$ of the instruction set $P_0$. An adaptation unit 23 is configured to determine adaptations of the processing unit P for implementing the permutation $P_x$ of the instruction set $P_0$. A customizing unit 24 is configured to customize the processing unit P in accordance with the determined adaptations. For this purpose, the customizing unit 24 may provide appropriate instructions I to a fabrication tool via an output 27. The output 27 may be combined with the input 21 into a single interface. A local storage unit 26 may be provided for storing data during processing. For example, the processing unit may be customized by the customizing unit 24 by adapting hardware of the processing unit. For this purpose, the permutation of the instruction set may be hard-wired in a data path from a memory of the processing unit to an instruction decoder of the processing unit, e.g. with micro-fuses or with a multi-layer printed circuit board. In the latter case, bit shifts in a first direction may be realized in a first layer of the printed circuit board, whereas bit shifts in a second direction may be realized in a second layer of the printed circuit board. Advantageously, the multi-layer printed circuit board further provides a signal run time adaption by a meandering signal routing. According to an alternative solution, the processing unit may be customized by the customizing unit 24 by providing the processing unit with microcode MC that is specific to the permutation of the instruction set. In this case, the microcode MC may be provided via the output 27.

The permutation unit 22, the adaptation unit 23, and the customizing unit 24 may be controlled by a control module 25. A user interface 28 may be provided for enabling a user to modify settings of the permutation unit 22, the adaptation unit 23, the customizing unit 24, and the control module 25. The permutation unit 22, the adaptation unit 23, the customizing unit 24, and the control module 25 can be embodied as dedicated hardware units. Of course, they may likewise be fully or partially combined into a single unit or implemented as software running on a processor, e.g. a CPU or a GPU.

Figure 3:
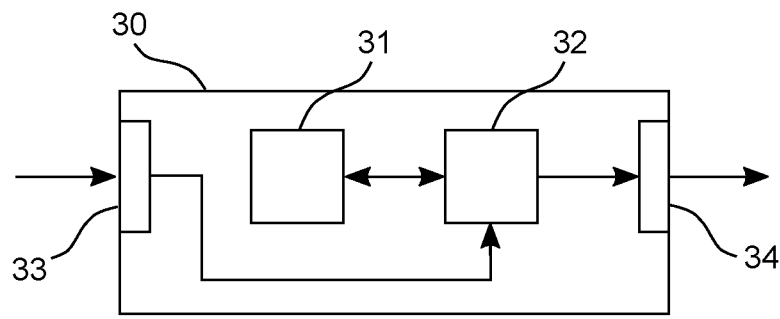
FIG. 3 schematically illustrates a second embodiment of an apparatus for customizing a processing unit.

A block diagram of a second embodiment of an apparatus 30 according to the invention for customizing a processing unit is illustrated in FIG. 3. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The local storage unit 26 and the memory device 31 may include volatile and/or non-volatile memory regions and storage devices such as hard disk drives, optical drives, and/or solid-state memories.

Figure 4:
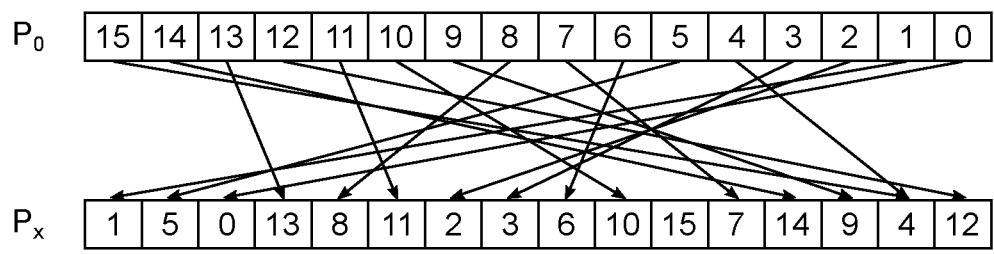
FIG. 4 schematically illustrates a permutation of bits of an instruction.

FIG. 4 schematically illustrates a permutation of bits of an instruction. In this example, a single word of the instruction set is shown. The word has 16 bits that are permuted. As can be seen, some bits are shifted to the left, whereas other bits are shifted to the right. Such shifts can easily be realized with a multi-layer printed circuit board. Bit shifts to the left are realized in a first layer of the printed circuit board and bit shifts to the right are realized in a second layer of the printed circuit board.

Usually only a small fraction of the possible instruction space is used, such as 100 to 500 unique instructions compared to the number of possible opcodes, e.g. $2^{16}$ or $2^{32}$. If the processor throws exceptions if an illegal opcode is discovered, chances to inject any meaningful instruction are severely limited, e.g. to about 0.38% per instruction word, given 250 instructions and 16 bits instruction word width. The probability to execute the intended instruction will be about 1 to N!, where N is the width of the instruction word in bits.

Figure 5:
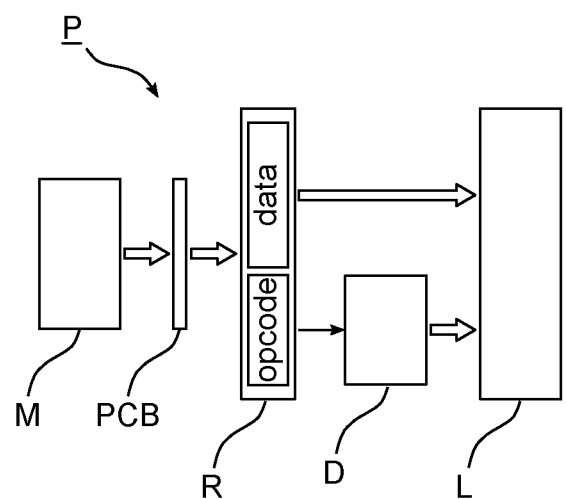
FIG. 5 schematically illustrates a processing unit that has been customized.

FIG. 5 schematically illustrates an exemplary processing unit P that has been customized. The processing unit P comprises a memory M, an instruction register R, an instruction decoder D, and a control logic L. Arranged between the memory M and the instruction register R is a multi-layer printed circuit board PCB, which implements the permutation used by the processing unit P and ensures that the correct opcodes are provided to the control logic L.

REFERENCE NUMERALS

20 Apparatus
21 Input
22 Permutation unit
23 Adaptation unit

24 Customizing unit
25 Control module
26 Local storage unit
27 Output
28 User interface
30 Apparatus
31 Memory device
32 Processing device
33 Input
34 Output
D Instruction decoder
I Instruction
L Control logic
M Memory
MC Microcode
P Processing unit
$P_0$ Instruction set
$P_x$ Permutation
PCB Printed circuit board
R Instruction register
S1 Determine permutation of instruction set
S2 Determine adaptations of processing unit for implementing permutation
S3 Customize processing unit in accordance with adaptations

The invention claimed is:

1. A method for customizing a processing unit, the method comprising:
determining a permutation of an instruction set of the processing unit, wherein instructions of the instruction set comprise bits that are arranged in an original order, and instructions of the permutation of the instruction set comprise bits that are rearranged into a permuted order that is different than the original order;
determining adaptations of the processing unit for implementing the permutation of the instruction set; and
customizing the processing unit in accordance with the determined adaptations by adapting hardware of the processing unit, wherein the permutation of the instruction set is hard-wired in a data path from a memory of the processing unit to an instruction decoder of the processing unit thereby protecting against unauthorized remote-code execution without using key-based encryption, without modifying the memory, and without modifying the instruction decoder.

2. The method according to claim 1, wherein hard-wiring of the permutation of the instruction set is realized with micro-fuses.

3. The method according to claim 1, wherein hard-wiring of the permutation of the instruction set is realized with a multi-layer printed circuit board.

4. The method according to claim 3, wherein bit shifts in a first direction are realized in a first layer of the printed circuit board and bit shifts in a second direction are realized in a second layer of the printed circuit board.

5. The method according to claim 3, wherein the multi-layer printed circuit board provides a signal run time adaption by a meandering signal routing.

6. The method according to claim 1, wherein the processing unit is customized by providing the processing unit with microcode that is specific to the permutation of the instruction set.

7. A processor that is customized to prevent unauthorized remote code execution by the processor, the processor comprising:
a memory that stores a permutated version of processor-executable instructions, wherein the permutated version of the processor-executable instructions includes a plurality of permutated processor-executable instructions, each having a data portion and a permutated-opcode portion, wherein instructions of the processor-executable instructions comprise bits that are arranged in an original order, and instructions of the permutated version of the processor-executable instructions comprise bits that are rearranged into a permutated order that is different than the original order;
an instruction register coupled to the memory that receives, as input from the memory, permutated processor-executable instructions;
an instruction decoder coupled to the instruction register that receives, as input from the instruction register, permutated-opcode portions of the permutated processor-executable instructions; and
control logic, which is coupled to the instruction register and to the instruction decoder, that receives, as input from the instruction decoder, decoded versions of the permutated-opcode portion of the permutated processor-executable instructions, and that receives, as input from the instruction register, the data portion of the permutated processor-executable instructions, such that a permutation of an instruction set of the processor is hard-wired in a data path from the memory of the processor to the instruction decoder of the processor such that unauthorized remote-code execution is prevented without using key-based encryption and without modifying the memory.

8. The processor of claim 7, wherein hard-wiring of the permutation of the instruction set is realized with micro-fuses.

9. The processor of claim 7, wherein hard-wiring of the permutation of the instruction set is realized with a multi-layer printed circuit board that is coupled to the memory and to the instruction register.

10. The processor of claim 9, wherein bit shifts in a first direction are realized in a first layer of the printed circuit board and bit shifts in a second direction are realized in a second layer of the printed circuit board.

11. The processor of claim 9, wherein the multi-layer printed circuit board provides a signal run time adaption by a meandering signal routing.

12. The processor of claim 7, wherein the processing unit is customized by providing the processing unit with microcode that is specific to the permutation of the instruction set.

* * * * *